(12) United States Patent
Cheng et al.

(10) Patent No.: US 11,829,124 B2
(45) Date of Patent: Nov. 28, 2023

(54) METHOD FOR PREDICTING OCCURRENCE OF TOOL PROCESSING EVENT AND VIRTUAL METROLOGY APPLICATION AND COMPUTER PROGRAM PRODUCT THEREOF

(71) Applicant: NATIONAL CHENG KUNG UNIVERSITY, Tainan (TW)

(72) Inventors: Fan-Tien Cheng, Tainan (TW); Yu-Ming Hsieh, Kaohsiung (TW); Jing-Wen Lu, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 400 days.

(21) Appl. No.: 17/134,133

(22) Filed: Dec. 24, 2020

(65) Prior Publication Data

US 2021/0382464 A1 Dec. 9, 2021

(30) Foreign Application Priority Data

Jun. 4, 2020 (TW) ................................ 109118836

(51) Int. Cl.
*G05B 19/418* (2006.01)
*G06F 18/22* (2023.01)
*G06F 18/243* (2023.01)
*G06F 18/214* (2023.01)
*G06F 18/2413* (2023.01)

(52) U.S. Cl.
CPC ..... *G05B 19/41875* (2013.01); *G06F 18/214* (2023.01); *G06F 18/22* (2023.01); *G06F 18/2413* (2023.01); *G06F 18/24323* (2023.01); *G05B 2219/32194* (2013.01); *G05B 2219/45031* (2013.01)

(58) Field of Classification Search
CPC .... G05B 19/41875; G05B 2219/32194; G05B 2219/45031; G06F 18/24323; G06F 18/22; G06F 18/2413; G06F 18/214
See application file for complete search history.

(56) References Cited

U.S. PATENT DOCUMENTS 7,593,912 B2    9/2009  Cheng et al.
7,603,328 B2   10/2009  Cheng et al.
(Continued)

FOREIGN PATENT DOCUMENTS

CN    108764597 A    11/2018

*Primary Examiner* — Thomas C Lee
*Assistant Examiner* — Ameir Myers
(74) *Attorney, Agent, or Firm* — CKC & Partners Co., LLC

(57) ABSTRACT

Embodiments of the present disclosure provide a method for predicting an occurrence of a tool processing event, thereby determining whether to activate a virtual metrology. In a model-building stage, plural sets of model-building data are used to create at least one classification model in accordance with at least one classification algorithm, in which each classification model includes plural decision trees. Then, probabilities of the decision trees are used to create at least one reliance index model, and the sets of model-building data are used to create at least one similarity index model in accordance with a statistical distance algorithm. In a conjecture stage, a set of processing data of a workpiece is inputted into each classification model, each reliance index model and each similarity index model to determine whether to activate (start) virtual metrology.

17 Claims, 9 Drawing Sheets

(56) References Cited

U.S. PATENT DOCUMENTS

| | | |
|---|---|---|
| 8,095,484 B2 | 1/2012 | Cheng et al. |
| 8,688,256 B2 | 4/2014 | Cheng et al. |
| 8,862,525 B2 | 10/2014 | Cheng et al. |
| 8,983,644 B2 | 3/2015 | Cheng et al. |
| 9,508,042 B2 | 11/2016 | Yang et al. |
| 9,829,415 B2 | 11/2017 | Cheng et al. |
| 10,242,319 B2 | 3/2019 | Cheng et al. |
| 10,269,660 B2 | 4/2019 | Cheng et al. |
| 11,295,993 B2 * | 4/2022 | Honda ............... H01L 22/10 |
| 2011/0202160 A1 * | 8/2011 | Moyne ............... G06N 5/04 700/104 |
| 2014/0135970 A1 * | 5/2014 | Kaushal ........ G05B 19/41875 700/121 |
| 2020/0045064 A1 * | 2/2020 | Bindal ............... G06N 20/00 |
| 2020/0051193 A1 | 2/2020 | Miao et al. |
| 2022/0291669 A1 * | 9/2022 | Dietz ............ G05B 19/41825 |

* cited by examiner

METHOD FOR PREDICTING OCCURRENCE OF TOOL PROCESSING EVENT AND VIRTUAL METROLOGY APPLICATION AND COMPUTER PROGRAM PRODUCT THEREOF

RELATED APPLICATIONS

The present application is based on, and claims priority from Taiwan Application Serial Number 109118836, filed Jun. 4, 2020, the disclosure of which is hereby incorporated by reference herein in its entirety.

BACKGROUND

Field of Invention

The present disclosure relates to a method for predicting an occurrence of a tool processing event, and a virtual metrology application and a computer program product thereof. More particularly, the present disclosure relates to a method for predicting an occurrence of a tool processing event, and a method for determining whether to activate a virtual metrology application and a computer program product thereof based on an automated classification scheme.

Description of Related Art

Virtual metrology has been quite widely applied in various industries, such as a semiconductor industry and a tooling industry. Virtual metrology can convert sampling inspections with metrology delay into real-time and on-line total inspections. For example, when virtual metrology is introduced into a wafer-sawing process in the semiconductor industry, process abnormalities can be found in real time and can be improved in time, thereby preventing an entire wafer lot from being scrapped subsequently. When virtual metrology is introduced into a machine tool, the quality precision of each processed workpiece (such as a vehicle wheel) can be conjectured for meeting the requirements real time and accuracy, thereby predicting the processing quality of the machine tool to overcome the shortcomings of the conventional in-line metrology and off-line metrology.

Although the conventional virtual metrology may be mostly suitable for its expected purposes, yet it still does not meet the requirements in various aspects.

SUMMARY

An object of the present invention is to provide a method for correctly predicting an occurrence of a tool processing event in real time, thereby determining whether to perform subsequent operations and treatments in time.

Another object of the present invention is to provide a method and a computer program product thereof for correctly determining whether to activate a virtual metrology application in real time, thus avoiding user misjudgments.

According to an aspect of the present invention, a method for predicting an occurrence of a tool processing event is provided. In the method, at first, plural sets of historical process data are obtained, in which the sets of historical process data are used or generated by a production tool when plural historical workpieces are processed by the production tool, and the sets of historical process data are one-to-one corresponding to the sets of historical workpieces. Then, plural historical processing event index values are obtained for indicating if a processing event occurred when the production tool processed each of the historical workpieces, in which the historical processing event index values are one-to-one corresponding to the sets of historical process data, and the historical processing event index values and the sets of historical process data respectively form plural sets of model-building data. Thereafter, a model-building operation is performed. In the model-building operation, a classification model is built by using the sets of model-building data in accordance with a classification algorithm, in which the classification model includes plural decision trees; and a reliance index model is built by using probabilities of the decision trees. Then, a conjecturing operation is performed. In the conjecturing operation, at least one set of process data is obtained, in which the at least one set of process data is used or generated by the production tool when at least one workpiece is processed; the at least one set of process data is inputted into the classification model, thereby obtaining at least one event predicted value used for indicating if the processing event occurs when the production tool is processing each of the at least one workpiece; and the reliance index model is used to compute a reliance index value of each of the at least one event predicted value for indicating a reliance level of each of the at least one event predicted value.

In some embodiments, each of the sets of historical process data includes plural parameters, and each of the at least one set of process data includes the parameters. In the aforementioned method for predicting the occurrence of the tool processing event, a data preprocessing operation is performed to convert values of the parameters in each of the sets of historical process data to first values of plural parameter indicators by using plural algorithms, in which the parameter indicators are one-to-one corresponding to the algorithms, the sets of model-building data including the historical processing event index values and the first values of the parameter indicators converted from each of the sets of historical process data; and the data preprocessing operation is performed to convert values of the parameters in each of the at least one set of process data to second values of the parameter indicators by using the algorithms, in which the conjecturing operation includes inputting the second values of the parameter indicators into the classification model, thereby obtaining the at least one event predicted value.

In some embodiments, the aforementioned model-building operation further includes building a similarity model by using the sets of model-building data in accordance with a statistical distance algorithm. The aforementioned conjecturing operation further includes using the similarity model to compute a global similarity index between the sets of model-building data and the second values of the parameter indicators in each of the at least one set of process data, thereby indicating degrees of similarity between the sets of model-building data and the second values of the parameter indicators.

In some embodiments, the number of the at least one set of process data is greater than one, and the number of the at least one workpiece is greater than one. The aforementioned method for predicting the occurrence of the tool processing event further includes obtaining plural actual processing event index values used for indicating if the processing event occurred when the production tool processed each of the workpieces; obtaining a correct rate of the event predicted values according to the actual processing event index values; checking if the sets of model-building data are imbalanced when the correct rate is smaller than a correct-rate threshold; adding the actual processing event index values and the values of the parameters in their corresponding sets of process data to the sets of model-building data when the sets of model-building data are imbalanced, and then performing the model-building operation again; and adjusting the classification model, the reliance index model and the similarity model by using the actual processing event index values and the values of the parameters in their corresponding sets of process data to the sets of model-building data, when the sets of model-building data are balanced.

In some embodiments, the aforementioned method for predicting the occurrence of the tool processing event further includes performing an oversampling operation on the sets of model-building data to generate a plurality of sets of sample data similar to data in a minority class in the sets of model-building data, thereby overcoming data imbalance of the sets of model-building data; and adding the sets of sample data to the sets of model-building data.

According to another aspect of the present invention, a method for determining whether to activate a virtual metrology is provided. In the method, plural sets of historical process data are obtained, in which the sets of historical process data are used or generated by a production tool when plural historical workpieces are processed by the production tool, and the sets of historical process data are one-to-one corresponding to the sets of historical workpieces. Then, plural historical processing event index values are obtained for indicating if a processing event occurred when the production tool processed each of the historical workpieces, in which the historical processing event index values are one-to-one corresponding to the sets of historical process data, and the historical processing event index values and the sets of historical process data respectively form a plurality of sets of model-building data Thereafter, a model-building operation is performed. In the model-building operation, two classification models are built by using the sets of model-building data in accordance with two classification algorithms, in which each of the classification models includes plural decision trees; and two reliance index models are built by using probabilities of the decision trees of each of the classification models. Thereafter, a conjecturing operation is performed. In the conjecturing operation, at least one set of process data is obtained, in which the at least one set of process data is used or generated by the production tool when at least one workpiece is processed; the at least one set of process data is inputted into the classification models, thereby obtaining at least one set of event predicted values used for indicating if the processing event occurred when the production tool processed each of the at least one workpiece, each of the at least one set of event predicted values includes a first event predicted value and a second event predicted value; the reliance index models are used to compute two reliance index values of each of the at least one set of event predicted values; one of the reliance index values is selected as a composite reliance index value, the one of the reliance index values corresponding to one of the first event predicted value and the second event predicted value that has a smaller reliance level than the other one of the first event predicted value and the second event predicted value; a step is performed to check if both of the first event predicted value and the second event predicted value indicate that the processing event will occur, thereby obtaining a first checking result; a virtual metrology is activated to conjecture quality of the workpiece when the first checking result is true; a step is performed to check if the composite reliance index value indicates that the one of the first event predicted value and the second event predicted value is smaller than a reliance index threshold when the first checking result is false, thereby obtaining a second checking result; and the virtual metrology is activated to conjecture quality of the workpiece when the second checking result is true.

In some embodiments, the aforementioned model-building operation includes building two similarity models by using the sets of model-building data in accordance with a statistical distance algorithm. The aforementioned method for determining whether to activate the virtual metrology further includes respectively using the two similarity models to compute two global similarity indexes between the sets of model-building data and the second values of the parameter indicators in each of the at least one set of process data; selecting one of the global similarity indexes as a composite global similarity index value, the one of the global similarity indexes representing less degrees of similarity between the sets of model-building data and the second values of the parameter indicators in each of the at least one set of process data; checking if the composite global similarity index indicates that the degrees of similarity between the sets of model-building data and the second values of the parameter indicators in each of the at least one set of process data is smaller than a global similarity index threshold when the second checking result is false, thereby obtaining a third checking result; and activating the virtual metrology to conjecture quality of the workpiece when the third checking result is true.

According to another aspect of the present invention, a computer program product stored on a non-transitory tangible computer readable recording medium is provided. When this computer program product is loaded and executed by a computer, the aforementioned method for determining whether to activate the virtual metrology is performed.

Hence, the application of the embodiments of the present disclosure can correctly predict an occurrence of a tool processing event in real time, thereby determining whether to perform subsequent operations and treatments in time. The application of the embodiments of the present disclosure also can correctly determine whether to activate a virtual metrology in real time, thus avoiding user misjudgments.

BRIEF DESCRIPTION OF THE DRAWINGS

The invention can be more fully understood by reading the following detailed description of the embodiment, with reference made to the accompanying drawings as follows.

DESCRIPTION OF THE PREFERRED EMBODIMENTS

Figure 1:
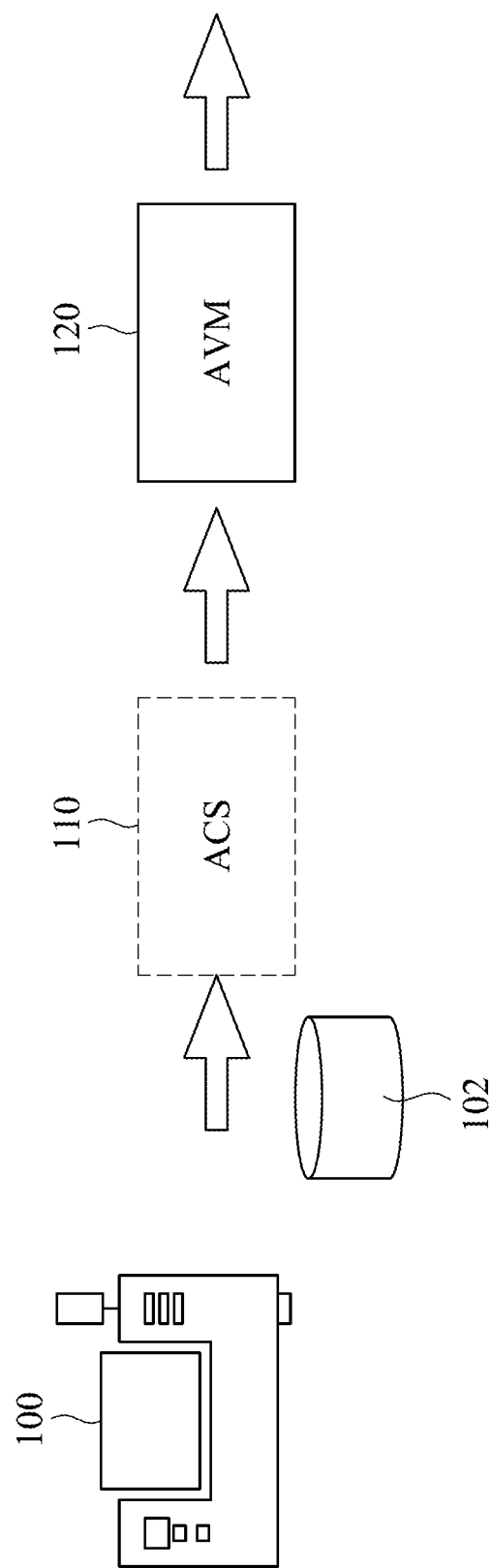
FIG. 1 is a schematic block diagram for explaining a virtual metrology application according to some embodiments of the disclosure.

Reference will now be made in detail to the embodiments of the present invention, examples of which are illustrated in the accompanying drawings. Wherever possible, the same reference numbers are used in the drawings and the description to refer to the same or like parts.

As used herein, the terms "first" and "second" do not intend to indicate a specific order or sequence, and are merely used for distinguishing the devices or operations described by similar phraseology or terminology herein.

Virtual metrology applied on a wafer sawing process is used for predicting a wafer-chipping amount. During the wafer sawing process, not every wafer (workpiece) would have a chipping event. However, because not recognizing whether the wafers have the occurrence of the wafer-chipping event, the virtual metrology generates a predicted wafer-chipping amount for each of the wafers, thus causing user misjudgments. In a tooling processing, not every workpiece is processed by a machine tool to generate a processing action event of the machine tool. However, because not recognizing whether the machine tool has the occurrence of the processing action event (i.e. the machine tool has contacted and processed the workpiece), the virtual metrology still generates a predicted accuracy value for each of the workpieces, thus causing a user to make a misjudgment on the workpieces that are not processed by the machine tool. Therefore, a human judgment has to be added to the virtual metrology for determining whether there is an occurrence of a processing event (such as wafer chipping or a tool processing action, etc.), thereby avoid user misjudgments.

In the virtual metrology, plural sets of model-building samples are used to build a virtual metrology model according to a conjecture algorithm. Each set of model-building samples includes a set of historical process data and a historical actual measurement value. The sets of historical process data are generated or used by a production tool when the production tool is processing historical workpieces. The sets of historical process data are one-to-one corresponding to the historical workpieces. The historical actual measurement value is obtained after one of the quality items of each historical workpiece is measured by a metrology tool. The conjecture (prediction) algorithm includes a neural network (NN) algorithm, a multi-regression (MR) algorithm, a partial least square (PLS) algorithm or a support vector machines (SVM) algorithm. For the wafer sawing process, the production tool is a wafer cutting tool; the historical actual measurement value (quality item) is a wafer-chipping amount; and the process data include blade clogging, a coolant flow rate, a spindle speed (RPM), a feeding rate, wafer conditions (such as thickness, coating, etc.), and/or a kerf width. For the tool processing, the production tool is a machine tool; the historical actual measurement value(s) (quality item(s)) include(s) roughness, straightness, angularity, perpendicularity, parallelism and/or roundness; and the process data include a working current, and/or vibration data and/or audio frequency data obtained by three-axis accelerometer sensors or acoustic sensors mounted on the machine tool.

Using the wafer sawing process as an example, when the sets of model-building samples include the samples with no occurrence of wafer-chipping event, the virtual metrology model (for predicting the wafer-chipping amounts) built by using the sets of model-building samples based on the neural network (NN) algorithm has a mean absolute error (MAE) of 1.234. When the sets of model-building samples do not include the samples with no occurrence of wafer-chipping event, the virtual metrology model (for predicting the wafer-chipping amounts) built by using the sets of model-building samples based on the neural network (NN) algorithm has a mean absolute error (MAE) of 1.067, which is better than the case of the sets of model-building samples including the samples with no occurrence of wafer-chipping event. It can be known from the above that the samples with no occurrence of wafer-chipping event have significant impacts on the accuracy of the virtual metrology.

Thus, embodiments of the disclosure provide an automated classification scheme for predicting there is an occurrence of a tool processing event, so as to determine whether to activate a virtual metrology or subsequent actions (such as shutdown, tool maintenance, etc.), in the tool processing event includes a wafer chipping event, or a tool processing action event, etc.

The virtual metrology, global similarity index, $DQI_X$ (process data quality index) and $DQI_y$ (metrology data quality index) used in embodiments of the disclosure hereinafter may refer to U.S. Pat. No. 8,095,484 B2. Embodiments of the disclosure may be combined with the virtual metrology with this US patent, i.e. U.S. Pat. No. 8,095,484 B2 is hereby incorporated by reference.

Referring to FIG. 1, FIG. 1 is a schematic block diagram for explaining a virtual metrology application according to some embodiments of the disclosure. At first, a set of process data 102 is obtained from a production tool 100, in which the set of process data 102 is generated or used by the production tool 100 when the production tool 100 is processing a workpiece. The set of process data 102 includes sensor data. Then, an automated classification scheme (ACS) 110 uses the set of process data 102 to predict whether the production tool 100 (such as a machine tool or a cutting tool) has an occurrence of a tool processing event (such as a wafer chipping event or a tool processing action event). If there is the occurrence of the tool processing event, a virtual metrology 120 can be activated, such as an automatic virtual metrology (AVM). Embodiments of the disclosure can automatically if there is an occurrence of a tool processing event, and the virtual metrology 120 is activated only when there is the occurrence of the tool processing event, thereby avoid user misjudgments.

Figure 2A:
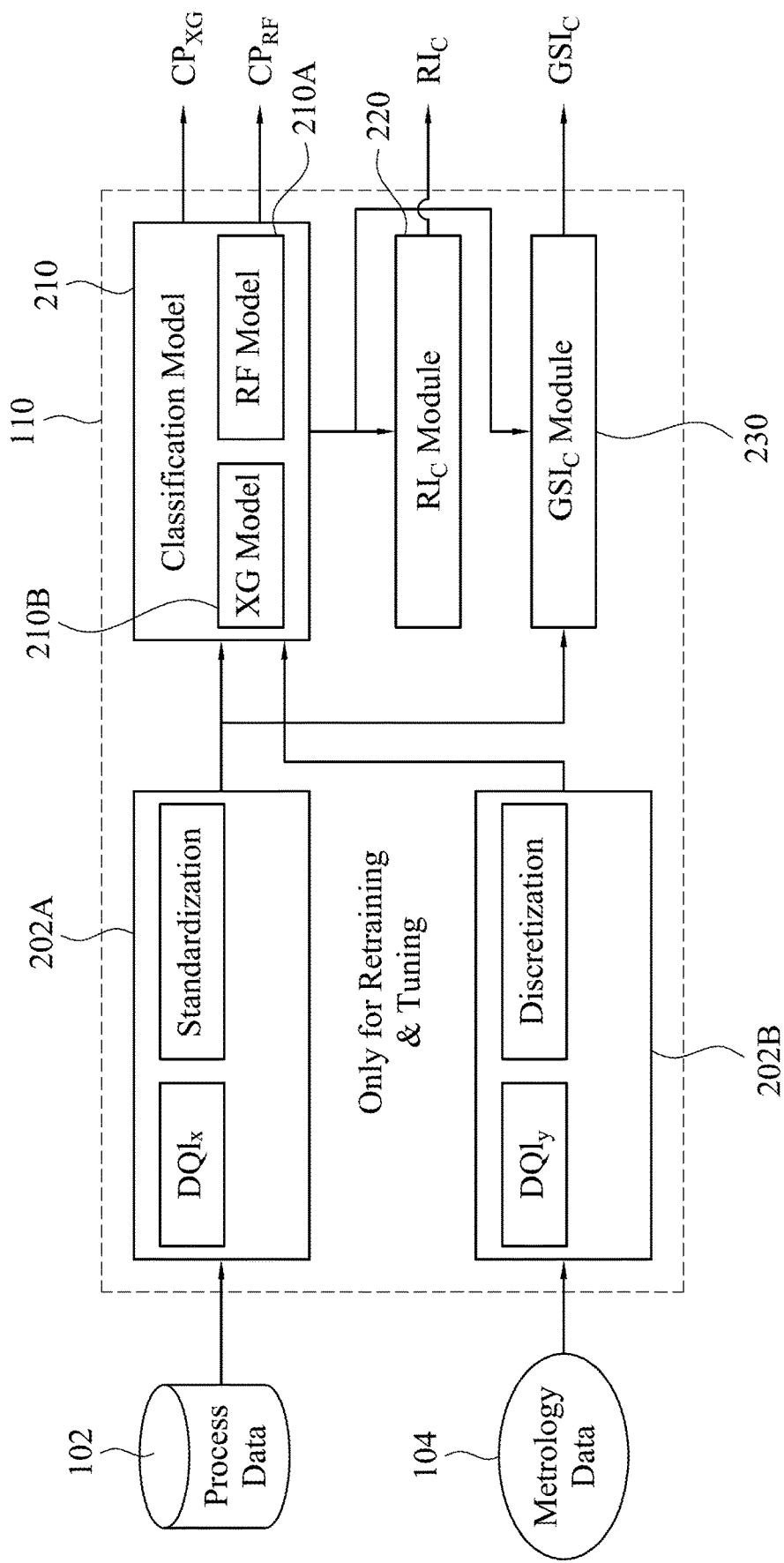
FIG. 2A is schematic block diagram for explaining an automated classification scheme according to some embodiments of the disclosure.

Referring to FIG. 2A, FIG. 2A is schematic block diagram for explaining an automated classification scheme according to some embodiments of the disclosure. The automated classification scheme (ACS) 110 includes a process data preprocessing operation 202A, a processing event data preprocessing operation 202B, classification models 210, a composite reliance index ($RI_C$) model 220 and a composite global similarity index ($GSI_C$) model 230. The process data preprocessing operation 202A performs data quality evaluation on the set of process data 102 based on the $DQI_X$ model, and arranges and standardizes (z-score) the original process data 102 from the production tool 100, deletes abnormal data and selects important parameters with the deletion of unimportant parameters, thereby preventing data interference that affects prediction accuracy. The processing event data preprocessing operation 202B performs data quality evaluation on metrology data 104 based on the $DQI_y$ model, and performs discretization and selection on the metrology data to delete the abnormal values therein. The metrology data 104 may be, for example, actual measurement values of workpieces (such as wafer chipping amounts, etc.) or the status of the production tool 100 (such as working current, etc.). The processing event data preprocessing operation 202B then converts the metrology data 104 to processing event index values used for indicating if processing events occur when the production tool is processing the workpieces. For example, a processing event index value indicating a processing action event of the production tool is obtained based on the working current i.e. when the working current is greater than or equal to a threshold value, it means that the production tool has processed a workpiece, and the processing event index value is such as "1". A processing event index value indicating a wafer-chipping event is obtained based on the wafer-chipping amount, i.e. when the wafer-chipping amount is greater than or equal to a threshold value, it means that the wafer-chipping occurs when the production tool is processing a wafer, and the processing event index value is such as "1".

The automated classification scheme (ACS) 110 employs a dual-phase operation scheme and classification algorithms to conjecture a processing event index of a workpiece. The classification schemes can be selected from various classification algorithms such as a random forest (RF) algorithm and an extreme gradient boosting (XGboost; XG) algorithm. In some embodiments, the classification models 210 include a RF model 210A and an XG model 210B for generating event predicted values $CP_{XG}$ and $CP_{RF}$ respectively. The $RI_C$ Model is used to gauge the reliance levels of the event predicted values $CP_{XG}$ and $CP_{RF}$ to generate a composite reliance index ($RI_C$). The $GS_C$ model 230 is used to calculate the similarity between a newly-inputted set of process data 102 and the sets of process data (model-building data) for model building or training in the classification models 210, and generates a composite global similarity index ($GSI_C$) to judge whether the newly-inputted process (parameters) data shift. The $GSI_C$ is used to assist the $RI_C$ to determine the degrees of confidence of the classification models 210.

Hereinafter, the classification models 210, the $RI_C$ model 220 and the $GSI_C$ model 230 are explained.

Figure 2B:
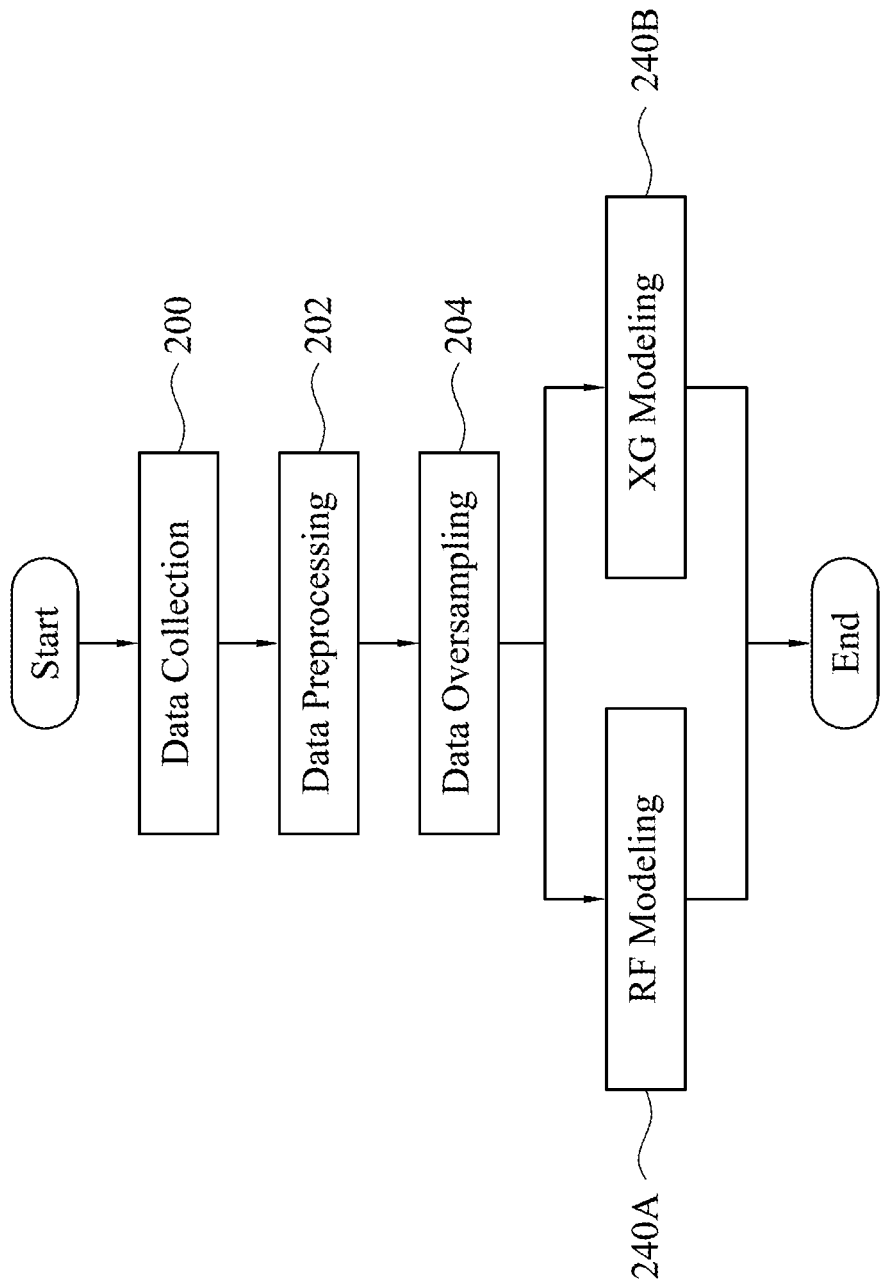
FIG. 2B is a flow chart showing a model-building step related to the automated classification scheme according to some embodiments of the disclosure.

Referring to FIG. 2B, FIG. 2B is a flow chart showing a model-building step related to the automated classification scheme according to some embodiments of the disclosure. At first, a data collection operation 200 is performed to obtain plural sets of historical process data and plural historical processing event index values. The sets of historical process data are used or generated by a production tool when plural historical workpieces are processed by the production tool, and the sets of historical process data are one-to-one corresponding to the sets of historical workpieces. The historical processing event index values are used to indicate if a processing event (such as a wafer-chipping event, a tool processing action event, etc.) occurred when the production tool processed each of the historical workpieces. Each set of historical process data includes plural parameters, and the parameters are the historical process data used for building the virtual metrology model described above. The historical processing event index values are one-to-one corresponding to the sets of historical process data. The historical processing event index values and their corresponding sets of historical process data respectively form plural sets of model-building data.

Thereafter, a data preprocessing operation 202 is performed to convert values of the parameters in each of the sets of historical process data to values of plural parameter indicators by using plural algorithms, in which the parameter indicators are one-to-one corresponding to the algorithms. The parameter indicators include a k-times frequency (where k is greater than 0) after conversion to a frequency domain, a kurtosis of statistic distribution, a skewness of statistic distribution, a standard deviation, a root mean square (RMS), a mean value, a maximum value, and/or a minimum value. After the data preprocessing operation 202 is performed, the sets of model-building data include the historical processing event index values and the values of their corresponding parameter indicators.

Then, an oversampling operation 204 is performed on the sets of model-building data to generate plural sets of sample data similar to data in a minority class in the sets of model-building data, thereby overcoming data imbalance of the sets of model-building data. The oversampling operation 204 may adopt a borderline-SMOTE (Synthetic Minority Oversampling Technique). The borderline-SMOTE is well known to those who are skilled in the art, and thus is described in detail herein.

Thereafter, the sets of sample data are added to the sets of model-building data for performing model-building operations 240A and 240B. The model-building operation 240A builds a classification model (such as a RF model) in accordance with a classification algorithm (such as the RF algorithm) based on bagging (from bootstrap aggregating) by using the sets of model-building data. The model-building operation 240B builds a classification model (such as a XG model) in accordance with a classification algorithm (such as the XG algorithm) based on boosting by using the sets of model-building data. The classification models (the RF model and the XG model) include plural RF decision trees 310A and plural XG decision trees 310B.

Figure 3B:
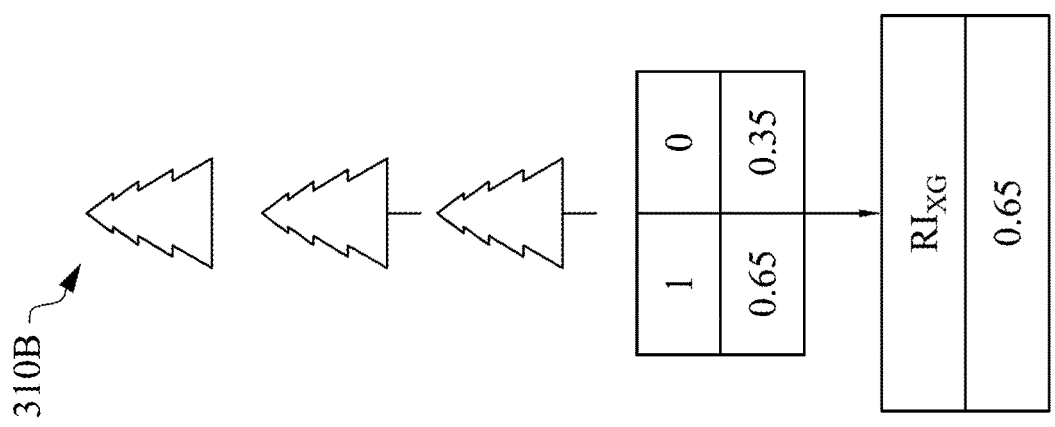
FIG. 3B is a schematic block diagram for explaining a reliance index model based on an extreme gradient boosting (XGboost; XG) algorithm according to some embodiments of the disclosure.
Figure 3A:
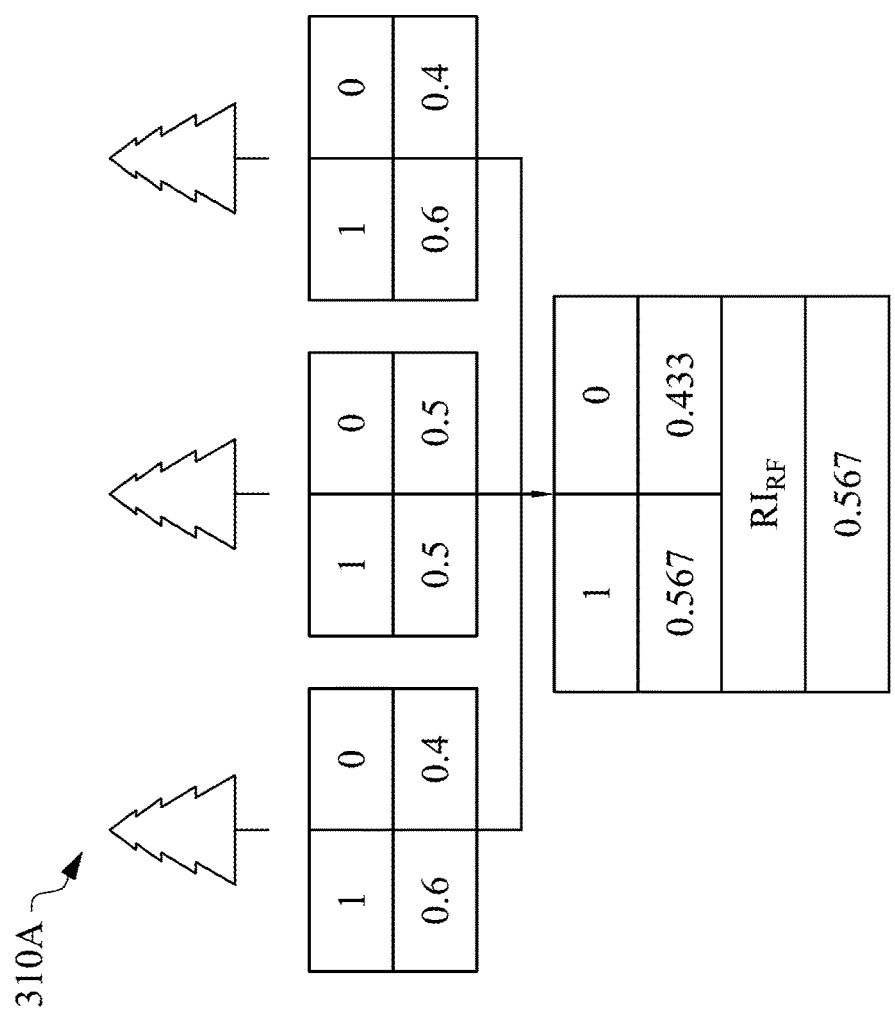
FIG. 3A is a schematic diagram for explaining a reliance index model based on a random forest (RF) algorithm according to some embodiments of the disclosure.

Referring to FIG. 3A and FIG. 3B, FIG. 3A and FIG. 3B are schematic diagrams for explaining reliance index model based on the RF algorithm and the XG algorithm according to some embodiments of the disclosure. The model-building operations 240A and 240B build two reliance index models (a $RI_{RF}$ model and a $RI_{X\ G}$ model) by using probabilities of the decision trees of the RF model and the XG model respectively, thereby computing the composite reliance index ($RI_C$). Hereinafter, the wafer sawing process is used as an example for explaining the computation method of the composite reliance index ($RI_C$), "Chipping" represents there is an occurrence of a tool processing event, and a binary value of its processing event index value is such as "1"; "Nonchipping" represents there is no occurrence of a tool processing event, and a binary value of its processing event index value is such as "0". The composite reliance index value ($RI_C$) is computed by the following equations.

$$RI_{RF} = \max\left(\frac{\Sigma PRF_{Chipping_i}}{n}, \frac{\Sigma PRF_{Nonchipping_i}}{n}\right) \quad (1)$$

$$RI_{XG} = \max\left(\sum PXG_{Chipping_i}, \sum PXG_{Nonchipping_i}\right) \quad (2)$$

$$RI_C = \min(RI_{RF}, RI_{XG}) \quad (3)$$

where n stands for the amount of the RF decision trees 310A; $PRF_{chipping_i}$ stands for a chipping probability of the $i^{th}$ RF decision tree 310A; $PRF_{Nonchipping_i}$ stands for a non-chipping probability of the $i^{th}$ RF decision tree 310A; $PXG_{chipping_i}$ stands for a chipping probability of the $i^{th}$ XG decision tree 310B; and PXG$_{Nonchipping_i}$ stands for a nonchipping probability of the i$^{th}$ XG decision tree 310B.

RI$_C$ is the minimal classification probability of RI$_{XG}$ and RI$_{RF}$, in which RI$_{RF}$ is a reliance index value of the RF model, and RI$_{XG}$ is a reliance index value of the XG model. In theory, it is classified to a certain category when the classification probability is greater than 0.5. However, the data slightly over 0.5 might be located at the classification boundary and that might cause misclassification. To ensure the correctness of classification, the threshold is set as 0.7. It is worthy to be noted that embodiments of the disclosure also can use one of the reliance index models (RI$_{XG}$ and RI$_{RF}$) alone to indicate the reliance level of the classification predicted value.

Figure 4:
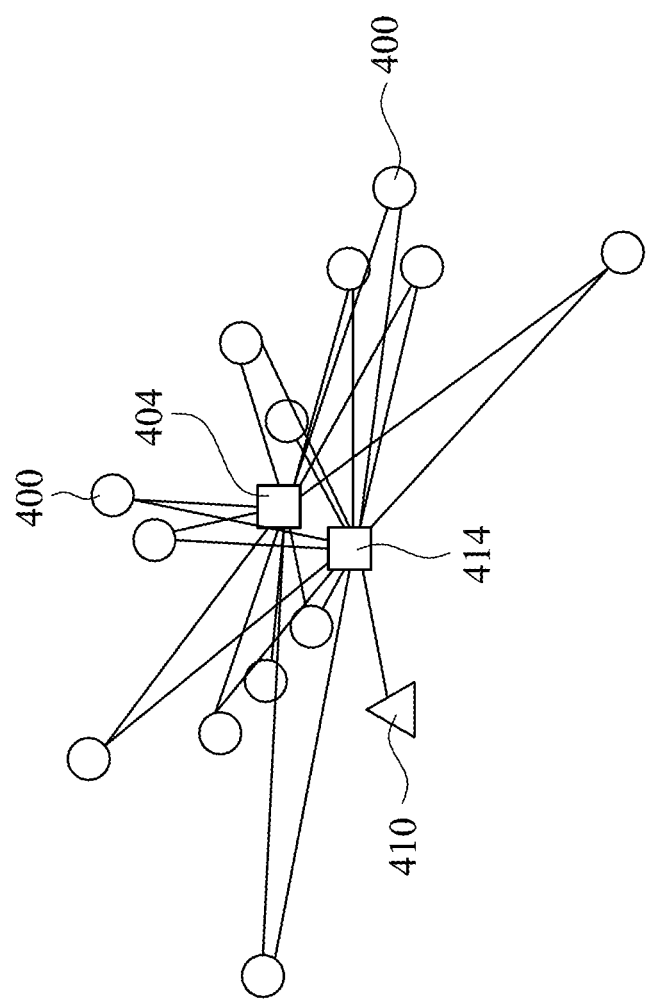
FIG. 4 is schematic diagram for explaining a similarity model of process parameters according to some embodiments of the disclosure.

The model-building operations 240A and 240B build two similarity models (such as GSI$_{XG}$ and GSI$_{RF}$ models) by using the sets of model-building data of the XG model and the RF model in accordance with a statistical distance algorithm, thereby computing a composite global similarity index value (GSI$_C$) for determining the similarity between the newly-inputted set of process data and the historical process data in the respective sets of model-building data. Referring to FIG. 4, FIG. 4 is schematic diagram for explaining a similarity model of process parameters according to some embodiments of the disclosure.

For example, a K means clustering algorithm is adopted to calculate a historical data center point 404 of plural historical data points 400 (for each set of model building data of the RF model or the XG model). After a new data point 410 is added, for example, the K means clustering algorithm is used again to calculate a new data center point 414. Then, the statistical distance algorithm is used to build similarity models (GSI$_{XG}$ and GSI$_{RF}$ models), thereby obtaining the distance between the historical data center point 404 and the new data center point 414. The statistical distance algorithm may be such as a Mahalanobis distance algorithm or a standardized Euclidean distance algorithm. The Mahalanobis distance algorithm is a useful way of determining similarity of an unknown sample set to a known sample set. This method considers the correlation of the data sets and is scale-invariant, namely it is not dependent on the scale of measurements. If the data set has high similarity, the calculated Mahalanobis distance calculated will be relatively small. The composite global similarity index value (GSI$_C$) is computed by the following equations.

$$SI_{RF}=1d(OriCenter_{RF},NewCenter_{RF}) \quad (4)$$

$$SI_{XG}=1d(OriCenter_{XG},NewCenter_{XG}) \quad (5)$$

$$GSI_C=\min(SI_{RF},SI_{XG}) \quad (6)$$

where d(X1, X2) is a statistical distance between two data points X1 and X2; OriCenter$_{RF}$ is a center point of the model-building data for the RF model; NewCenter$_{RF}$ is a center point of the model-building data for the RF model and the new data point; OriCenter$_{XG}$ is a center point of the model-building data for the XG model; NewCenter$_{XG}$ is a center point of the model-building data for the XG model and the new data point; SI$_{RF}$ is the global similarity index value between the new data point and the model-building data for the RF model; SI$_{XG}$ is the global similarity index value between the new data point and the model-building data for the XG model.

Embodiments of the disclosure uses a cross validation's leave-one-out (LOO) method to compute a global similarity index threshold (GSI$_T$). The global similarity index threshold (GSI$_T$) used in embodiments of the disclosure hereinafter may refer to U.S. Pat. No. 8,095,484 B2. Embodiments of the disclosure may be combined with the virtual metrology with this US patent, i.e. U.S. Pat. No. 8,095,484 B2 is hereby incorporated by reference. For the sake of convenient GSI$_C$ management, the composite global similarity index value (GSI$_C$) is normalized to vary from 1 (maximum) to 0 (minimum), in which the higher GSI$_C$ indicates more similarity between the new data point and the model-building data for the classification mode. In some embodiments, the GSI$_T$ is mapped to 0.7, i.e. when the GSI$_C$ is smaller than 0.7, the similarity between the new data point and the model-building data for the classification model is low, and there are larger deviations in the parameters of the new data from those of the model-building data, thus affecting the prediction correctness of the classification model. It is noted that those who are skilled in the art also may vary equations (4) and (5) to show that the higher value of the GSI$_C$ indicates less similarity between the new data point and the model-building data for the classification model.

Figure 5A:
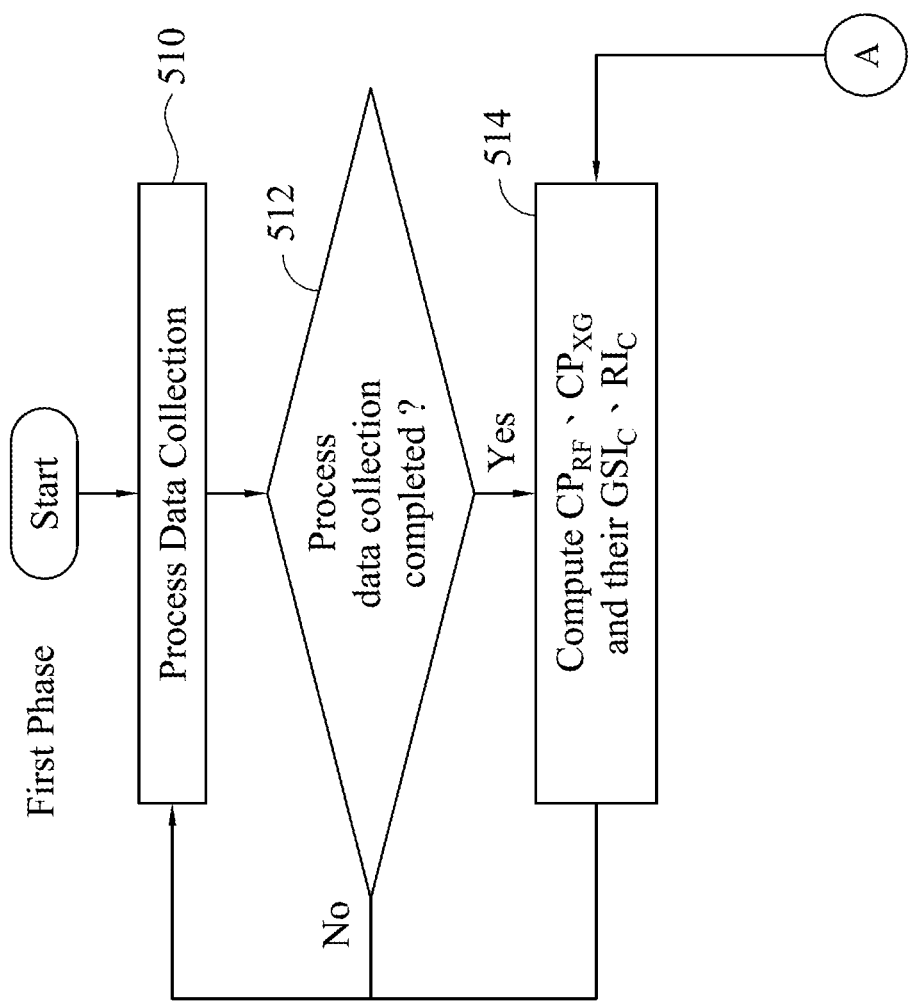
FIG. 5A and FIG. 5B are a flow chart showing a dual-phase method for predicting an occurrence of a tool processing event according to some embodiments of the disclosure.
Figure 5B:
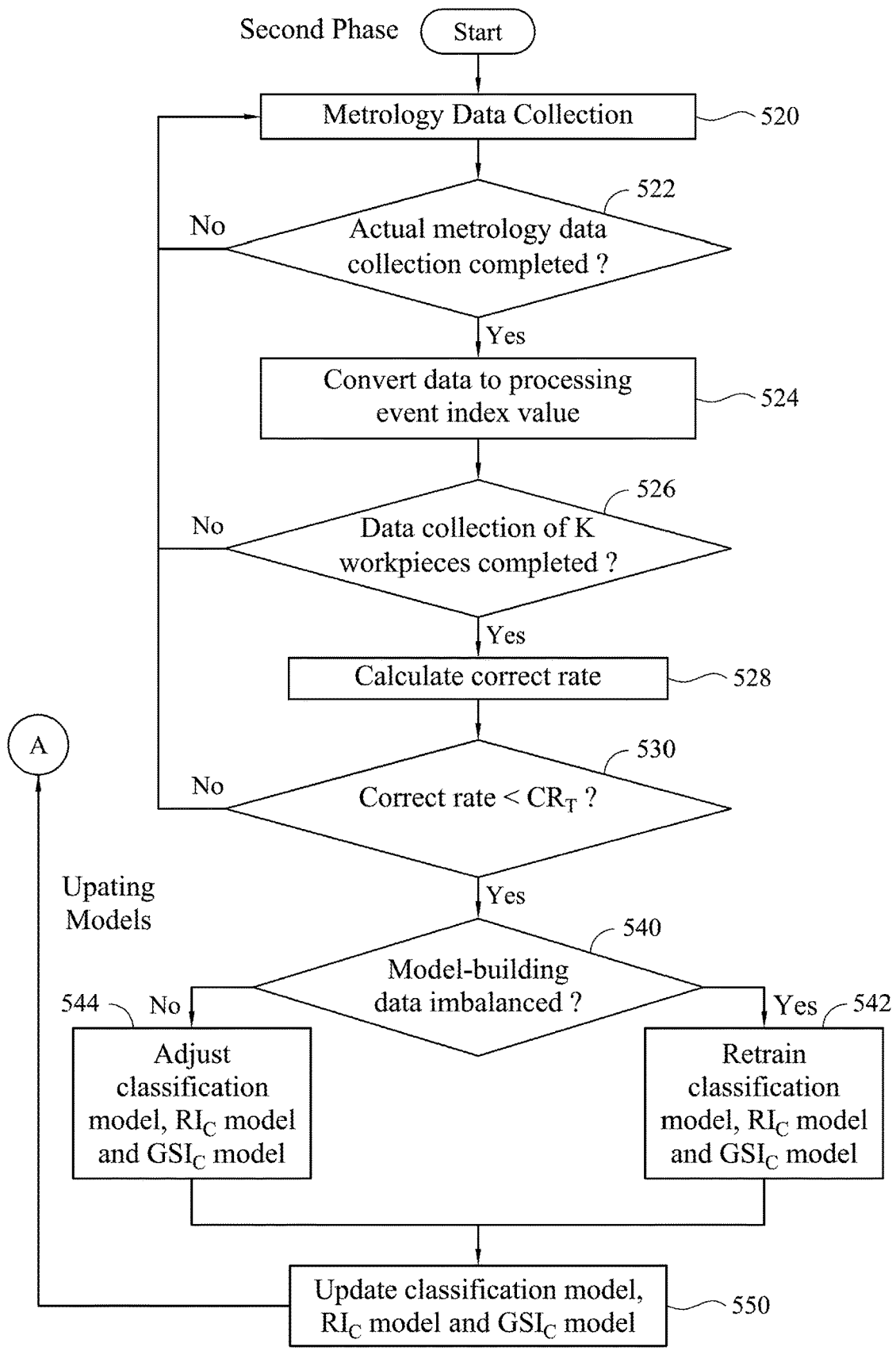

After the model-building operations have built the classification models, the RI$_C$ model and the GSI$_C$ model, a conjecturing operation is performed to predict if a tool processing event occurs. FIG. 5A and FIG. 5B are a flow chart showing a dual-phase method for predicting an occurrence of a tool processing event according to some embodiments of the disclosure. In a first phase, a process data collection operation 510 is performed to obtain a set of process data, in which the set of process data is used or generated by the production tool when a workpiece is processed by the production tool. The set of process data includes the same parameters of the sets of historical process data. Then, operation 512 is performed to determine if the process data collection of the workpiece is completed. When the result of operation 512 is yes, operation 514 is performed to input the set of process data into the classification models (such as the RF model and the XG model), the RI$_C$ model and the GSI$_C$ model, thereby obtaining one or two event predicted values (CP$_{XG}$ and/or CP$_{RF}$) and their accompanying composite global similarity index value (GSI$_C$) and composite reliance index value (RI$_C$) for indicating whether there is an occurrence of a processing event when the production tool is processing the workpiece. Before the set of process data is inputted into the classification models, the data preprocessing operation 202 as shown in FIG. 2B can be performed to convert values of the parameters in the set of process data to values of the aforementioned parameter indicators by using the aforementioned algorithms. When the result of operation 512 is no or after operation 514 is completed, the dual-phase method returns to the process data collection operation 510 to obtain another set of process data used or generated by the production tool when a next workpiece is processed by the production tool.

In a second phase, at first, a metrology data collection operation 520 is performed to obtain actual metrology data of the workpiece processed in the first phase or the production tool processing the workpiece. The actual metrology data may be an actual measurement value of the workpiece (such as a wafer chipping amount, etc.) or the status of the production tool 100 (such as working current, etc.). Then, operation 522 is performed to determine if the collection of the actual metrology data is completed. When the result of operation 522 is yes, operation 524 is performed to convert the actual metrology data to a processing event index value used for indicating if a processing event occurs when the production tool is processing the workpiece. For example, when the wafer-chipping amount is greater than or equal to a threshold value, it means that the wafer-chipping occurs when the production tool is processing the workpiece, and the processing event index value is such as "1"; and, when the wafer-chipping amount is smaller than the threshold value, it means that no wafer-chipping occurs when the production tool is processing the workpiece, and the processing event index value is such as "0". For another example, when the working current is greater than or equal to a threshold value, it means that the production tool has processed a workpiece (has a processing action), and the processing event index value is such as "1"; and when the working current is smaller than the threshold value, it means that the production tool does not process the workpiece (has no processing action), and the processing event index value is such as "0".

Thereafter, operation 526 is performed to determine if actual metrology data of k pieces of workpieces and their corresponding k event predicted values have been obtained, in which k is greater than and may be such as 10. When the result of operation 526 is yes, operation 528 is performed to calculate a correct rate of these event predicted values, and the correct rate is calculated by the following equations.

$$\text{Sensitiviy} = \frac{TP}{TP+FN} \times 100 \quad (7)$$

$$\text{Specificity} = \frac{TN}{TN+FP} \times 100 \quad (8)$$

$$\text{correct rate} = \frac{\text{Sensitivity} + \text{Specificity}}{2} \quad (9)$$

where TP stands for the number of samples of true positive which is an outcome where there is an occurrence of the tool processing event, and the event predicted value predicts the same; TN stands for the number of samples of true negative which is an outcome where there is no occurrence of the tool processing event, and the event predicted value predicts the same; FP stands for the number of samples of false positive which is an outcome where there is no occurrence of the tool processing event, but the event predicted value predicts the opposite; FN stands for the number of samples of false negative which is an outcome where there is an occurrence of the tool processing event, but the event predicted value predicts the opposite. Thereafter, operation 530 is performed to check if the correct rate is smaller than a correct-rate threshold ($CR_T$). When the result of operation 530, 526 or 522 is no, the dual-phase method returns to the metrology data collection operation 520 to obtain actual metrology data of a next workpiece or the production tool processing the next workpiece.

When the result of operation 530 is yes, operation 540 is performed to check if the sets of model-building data are imbalanced. When the result of operation 540 is yes, the actual processing event index values and the values of the parameters in their corresponding sets of process data are added to the sets of model-building data, and then the model-building operation is performed again (operation 542) to retrain one of the classification models, one of the reliance index models and one of the global similarity models corresponding to the correct rate. When the result of operation 540 is no, one of the classification models, one of the reliance index models and one of the similarity models are adjusted by using the actual processing event index values and the values of the parameters in their corresponding sets of process data to the sets of model-building data (operation 544). In some embodiments, a data-imbalance ratio is to 1:3, i.e. when the occurrence rate of wafer chipping event in the sets of model-building data is less than 25%, the sets of model-building data are imbalanced, and the models need retraining. After operations 542 and 544 are performed, the classification model(s), the reliance index model(s) and the similarity index model(s) in the first phase can be updated (operation 550).

It is worthy to be noted that, in the first phase, two classification models from two different classification algorithms and their reliance index models and similarity models may be used. Thus, the second phase may be performed with respect to the two classification models and their reliance index models and similarity models.

Figure 6:
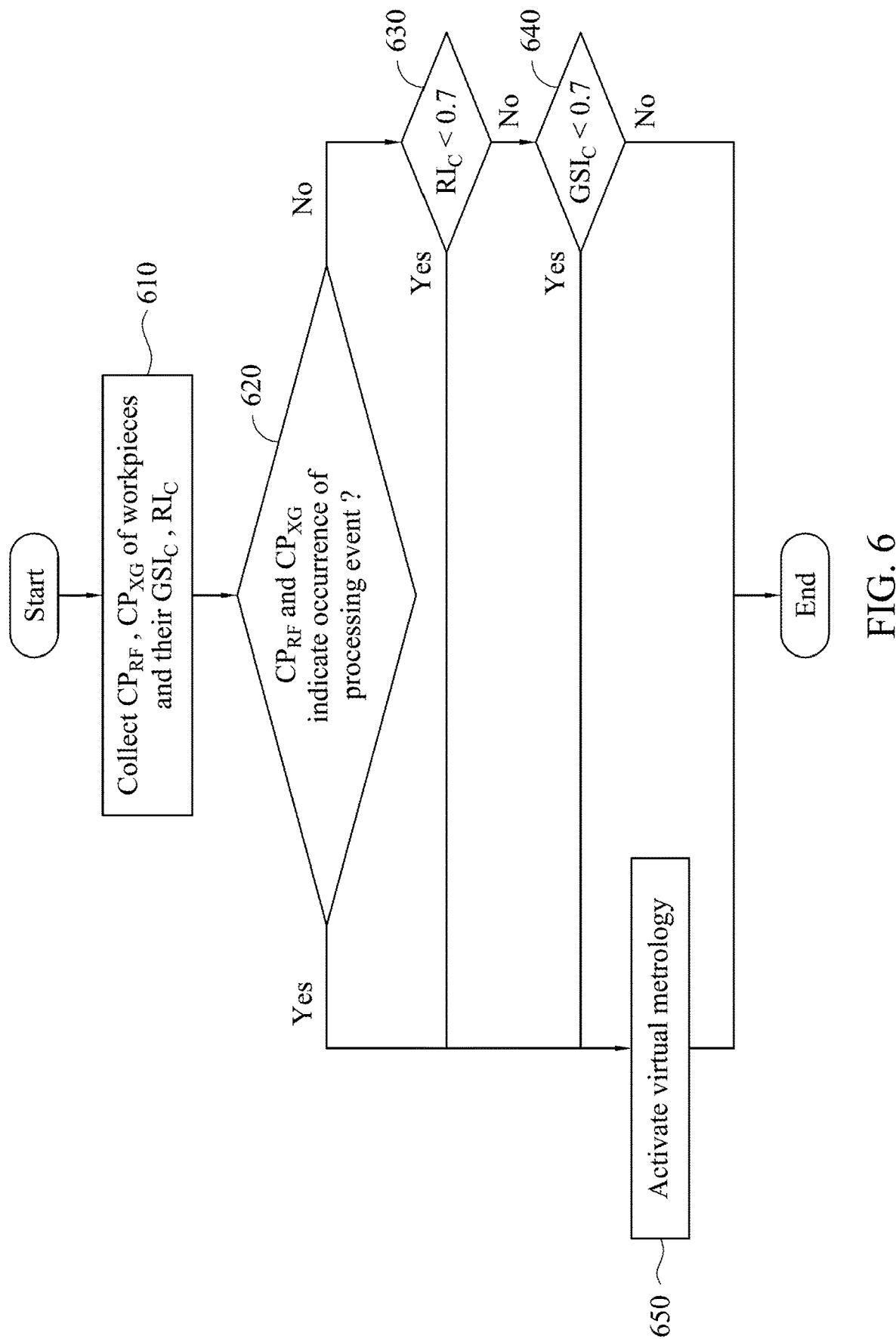
FIG. 6 is a flow chart showing a method for determining whether to activate a virtual metrology application according to some embodiments of the disclosure.

Because the samples without the occurrence of processing event have significant impacts on the accuracy of virtual metrology, embodiments of the disclosure determines whether to activate a virtual metrology by using the aforementioned method for predicting an occurrence of a tool processing event. Referring to FIG. 6, FIG. 6 is a flow chart showing a method for determining whether to activate a virtual metrology application according to some embodiments of the disclosure. At first, operation 610 is performed to obtain a set of event predicted values of a workpiece and its accompanying composite global similarity index value ($GSI_C$) and composite reliance index value ($RI_C$), in which the set of event predicted values includes a first event predicted value (for example, $CP_{RF}$) and a second event predicted value (for example, $CP_{XG}$). Thereafter, operation 620 is performed to check if both of the first event predicted value and the second event predicted value indicate that the processing event will occur. When the result of operation 620 is yes, a virtual metrology is activated to conjecture the quality of the workpieces. When the result of operation 620 is no, operation 620 is performed to check if the composite reliance index value ($RI_C$) is smaller than a reliance index threshold (for example, 0.7). When the result of operation 630 is yes, the virtual metrology is activated. When the result of operation 630 is no, operation 640 is performed to check if the composite global similarity index value ($GSI_C$) is smaller than a global similarity index threshold (for example, 0.7). When the result of operation 640 is yes, the virtual metrology is activated. When the result of operation 640 is no, the virtual metrology is not activated.

Figure 7:
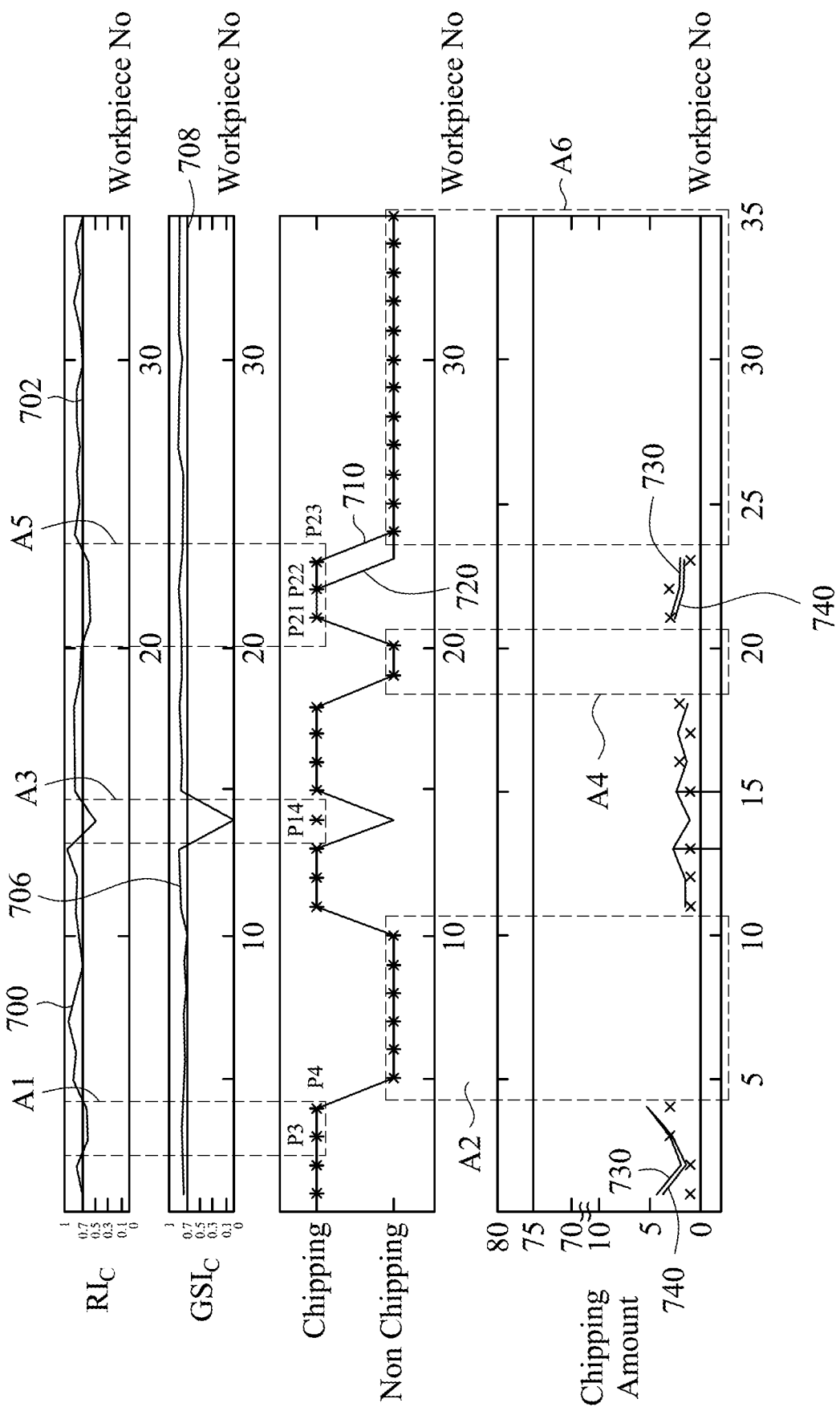
FIG. 7 shows prediction results of an application example of the disclosure.

Hereinafter, an application example of wafer chipping is used to explain the embodiments of the disclosure. Referring to FIG. 7, FIG. 7 shows prediction results of the application example of the disclosure, in which "*" represents an actual processing event index value; "x" represents an actual wafer-chipping amount; a curve 700 shows the composite reliance index values ($RI_C$) of respective workpieces; a straight line 702 shows a reliance index threshold; a curve 706 shows the composite global similarity index values ($GSI_C$) of the respective workpieces; a straight line 708 shows a global similarity index threshold; a curve 710 shows first event predicted values ($CP_{RF}$) of the respective workpieces, and a curve 720 shows second event predicted values ($CP_{XG}$) of the respective workpieces, in which the curves 710 and 720 are overlapped as one curve except at a workpiece number P23; a curve 730 shows virtual metrology values (predicted wafer-chipping amounts) of the respective workpieces by using a neural network (NN) algorithm; and a curve 740 shows virtual metrology values (predicted wafer-chipping amounts) of the respective workpieces by using a partial least square (PLS) algorithm. Except at a workpiece number P14 in an area A3 and at a workpiece number P23 in an area A5, the first event predicted values ($CP_{RF}$) and the second event predicted values ($CP_{XG}$) match with the actual processing event index values, in which the correct rate of the first event predicted values ($CP_{RF}$) is 0.9714, and the correct rate of the second event predicted values ($CP_{XG}$) is 0.9428.

The event predicted values of the workpieces in areas A2, A4 and A6 all indicate no occurrence of wafer chipping events, and thus no virtual metrology is performed, i.e. the wafer-chipping amounts are not predicted. The composite reliance index values ($RI_C$) of workpiece numbers P3 and P4 in an area A1 and workpiece numbers P21 and P22 in an area A5 are poor (<0.7), but their $CP_{RF}$ and $CP_{XG}$ all indicate that there are occurrences of wafer chipping events, and thus the virtual metrology is performed to predict the wafer-chipping amounts. The $CP_{RF}$ and $CP_{XG}$ of the workpiece number P14 in the area A3 both indicate no occurrence of wafer chipping event (which does not match with the actual processing event index), but its $RI_C$ and $GSI_C$ are poor (<0.7), thus the virtual metrology is still performed to predict the wafer-chipping amount. The $CP_{RF}$ of a workpiece number P23 in the area A5 matches with the actual processing event index, and its $CP_{XG}$ does not match with the actual processing event index, but its $RI_C$ is poor (<0.7), and thus the virtual metrology is performed to predict the wafer-chipping amount. Apparently, the $RI_C$ and $GSI_C$ of the workpiece number P14 and the $RI_C$ of the workpiece number P23 can modify the problem of inaccurate $CP_{RF}$ and $CP_{XG}$. Therefore, it can be known from this application example that embodiments of the disclosure can effectively predict the occurrence of the tool processing events, and can accurately determine whether to activate a virtual metrology.

It is understood that the method for predicting an occurrence of a tool processing event, and the method for determining whether to activate a virtual metrology application are performed by the aforementioned operations. A computer program of the present disclosure stored on a non-transitory tangible computer readable recording medium is used to perform the method described above. The aforementioned embodiments can be provided as a computer program product, which may include a machine-readable medium on which instructions are stored for programming a computer (or other electronic devices) to perform a process based on the embodiments of the present disclosure. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present disclosure also can be downloaded as a computer program product, which may be transferred from a remote computer to a requesting computer by using data signals via a communication link (such as a network connection or the like).

It is also noted that the present disclosure also can be described in the context of a manufacturing system. Although the present disclosure may be implemented in semiconductor fabrication, the present disclosure is not limited to implementation in semiconductor fabrication and may be applied to other manufacturing industries, in which the manufacturing system is configured to fabricate workpieces or products including, but not limited to, microprocessors, memory devices, digital signal processors, application specific integrated circuits (ASICs), or other similar devices. The present disclosure may also be applied to workpieces or manufactured products other than semiconductor devices, such as vehicle wheels, screws. The manufacturing system includes one or more processing tools that may be used to form one or more products, or portions thereof, on the workpieces (such as wafers, glass substrates). Persons of ordinary skill in the art should appreciate that the processing tools may be implemented in any number of entities of any type, including lithography tools, deposition tools, etching tools, polishing tools, annealing tools, machine tools, and the like. In the embodiments, the manufacturing system also includes one or more metrology tools, such as scatterometers, ellipsometers, scanning electron microscopes, and the like.

It can be known from the above that, the application of the embodiments of the present invention can correctly predict an occurrence of a tool processing event in real time, thereby determining whether to perform subsequent operations and treatments in time. The application of the embodiments of the present disclosure also can correctly determine whether to activate a virtual metrology in real time, thus avoiding user misjudgments.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for predicting an occurrence of a tool processing event, the method comprising:
   obtaining a plurality of sets of historical process data, wherein the sets of historical process data are used or generated by a production tool when a plurality of historical workpieces are processed by the production tool, and the sets of historical process data are one-to-one corresponding to the sets of historical workpieces;
   obtaining a plurality of historical processing event index values used for indicating if a processing event occurred when the production tool processed each of the historical workpieces, wherein the historical processing event index values are one-to-one corresponding to the sets of historical process data, and the historical processing event index values and the sets of historical process data respectively form a plurality of sets of model-building data;
   performing a model-building operation, comprising:
      building a classification model by using the sets of model-building data in accordance with a classification algorithm, wherein the classification model comprises a plurality of decision trees; and
      building a reliance index model by using probabilities of the decision trees; and
   performing a conjecturing operation, comprising:
      obtaining at least one set of process data, wherein the at least one set of process data is used or generated by the production tool when at least one workpiece is processed;
      inputting the at least one set of process data into the classification model, thereby obtaining at least one event predicted value used for indicating if the processing event occurs when the production tool is processing each of the at least one workpiece; and
      using the reliance index model to compute a reliance index value of each of the at least one event predicted value for indicating a reliance level of each of the at least one event predicted value;

wherein the at least one event predicted value is used to actually adjust the production tool.

2. The method of claim 1, wherein each of the sets of historical process data comprises a plurality of parameters, and each of the at least one set of process data comprises the parameters, the method further comprising:

performing a data preprocessing operation to convert values of the parameters in each of the sets of historical process data to first values of a plurality of parameter indicators by using a plurality of algorithms, wherein the parameter indicators are one-to-one corresponding to the algorithms, the sets of model-building data comprising the historical processing event index values and the first values of the parameter indicators converted from each of the sets of historical process data; and performing the data preprocessing operation to convert values of the parameters in each of the at least one set of process data to second values of the parameter indicators by using the algorithms, wherein the conjecturing operation comprises inputting the second values of the parameter indicators into the classification model, thereby obtaining the at least one event predicted value.

3. The method of claim 2, wherein the model-building operation comprises:

building a similarity model by using the sets of model-building data in accordance with a statistical distance algorithm;

the conjecturing operation further comprising:

using the similarity model to compute a global similarity index between the sets of model-building data and the second values of the parameter indicators in each of the at least one set of process data, thereby indicating degrees of similarity between the sets of model-building data and the second values of the parameter indicators.

4. The method of claim 3, wherein the number of the at least one set of process data is greater than one, and the number of the at least one workpiece is greater than one, the method further comprising:

obtaining a plurality of actual processing event index values used for indicating if the processing event occurred when the production tool processed each of the workpieces;

obtaining a correct rate of the event predicted values according to the actual processing event index values;

checking if the sets of model-building data are imbalanced when the correct rate is smaller than a correct-rate threshold;

adding the actual processing event index values and the values of the parameters in their corresponding sets of process data to the sets of model-building data when the sets of model-building data are imbalanced, and then performing the model-building operation again; and adjusting the classification model, the reliance index model and the similarity model by using the actual processing event index values and the values of the parameters in their corresponding sets of process data to the sets of model-building data, when the sets of model-building data are balanced.

5. The method of claim 1, further comprising:

performing an oversampling operation on the sets of model-building data to generate a plurality of sets of sample data similar to data in a minority class in the sets of model-building data, thereby overcoming data imbalance of the sets of model-building data; and adding the sets of sample data to the sets of model-building data.

6. A method for determining whether to activate a virtual metrology, the method comprising:

obtaining a plurality of sets of historical process data, wherein the sets of historical process data are used or generated by a production tool when a plurality of historical workpieces are processed by the production tool, and the sets of historical process data are one-to-one corresponding to the sets of historical workpieces;

obtaining a plurality of historical processing event index values used for indicating if a processing event occurred when the production tool processed each of the historical workpieces, wherein the historical processing event index values are one-to-one corresponding to the sets of historical process data, and the historical processing event index values and the sets of historical process data respectively form a plurality of sets of model-building data;

performing a model-building operation, comprising:

building two classification models by using the sets of model-building data in accordance with two classification algorithms, wherein each of the classification models comprises a plurality of decision trees; and building two reliance index models by using probabilities of the decision trees of each of the classification models; and performing a conjecturing operation, comprising:

obtaining at least one set of process data, wherein the at least one set of process data is used or generated by the production tool when at least one workpiece is processed;

inputting the at least one set of process data into the classification models, thereby obtaining at least one set of event predicted values used for indicating if the processing event occurred when the production tool processed each of the at least one workpiece, each of the at least one set of event predicted values comprising a first event predicted value and a second event predicted value;

using the reliance index models to compute two reliance index values of each of the at least one set of event predicted values;

selecting one of the reliance index values as a composite reliance index value, the one of the reliance index values corresponding to one of the first event predicted value and the second event predicted value that has a smaller reliance level than the other one of the first event predicted value and the second event predicted value;

checking if both of the first event predicted value and the second event predicted value indicate that the processing event will occur, thereby obtaining a first checking result;

activating a virtual metrology to conjecture quality of the workpiece when the first checking result is true;

checking if the composite reliance index value indicates that the one of the first event predicted value and the second event predicted value is smaller than a reliance index threshold when the first checking result is false, thereby obtaining a second checking result; and activating the virtual metrology to conjecture quality of the workpiece when the second checking result is true;

wherein the at least one set of event predicted values is used to actually adjust the production tool.

7. The method of claim 6, wherein each of the sets of historical process data comprises a plurality of parameters, and each of the at least one set of process data comprises the parameters, the method further comprising:

performing a data preprocessing operation to convert values of the parameters in each of the sets of historical process data to first values of a plurality of parameter indicators by using a plurality of algorithms, wherein the parameter indicators are one-to-one corresponding to the algorithms, the sets of model-building data comprising the historical processing event index values and the first values of the parameter indicators converted from each of the sets of historical process data; and performing the data preprocessing operation to convert values of the parameters in each of the at least one set of process data to second values of the parameter indicators by using the algorithms, wherein the conjecturing operation comprises inputting the second values of the parameter indicators into the classification model, thereby obtaining the at least one event predicted value.

8. The method of claim 7, wherein the model-building operation comprises:

building two similarity models by using the sets of model-building data in accordance with a statistical distance algorithm;

the method further comprising:

respectively using the two similarity models to compute two global similarity indexes between the sets of model-building data and the second values of the parameter indicators in each of the at least one set of process data;

selecting one of the global similarity indexes as a composite global similarity index value, the one of the global similarity indexes representing less degrees of similarity between the sets of model-building data and the second values of the parameter indicators in each of the at least one set of process data;

checking if the global similarity index indicates that the degrees of similarity between the sets of model-building data and the second values of the parameter indicators in each of the at least one set of process data is smaller than a global similarity index threshold when the second checking result is false, thereby obtaining a third checking result; and activating the virtual metrology to conjecture quality of the workpiece when the third checking result is true.

9. The method of claim 8, wherein the number of the at least one set of process data is greater than one, and the number of the at least one workpiece is greater than one, the method further comprising:

obtaining a plurality of actual processing event index values used for indicating if the processing event occurs when the production tool is processing each of the workpieces;

obtaining a first correct rate of the first event predicted values and a second correct rate of the second event predicted values according to the actual processing event index values;

checking if the sets of model-building data are imbalanced when the first correct rate or the first correct rate is smaller than a correct-rate threshold;

adding the actual processing event index values and the values of the parameters in their corresponding sets of process data to the sets of model-building data when the sets of model-building data are imbalanced, and then performing the model-building operation again to retrain one of the classification models, one of the reliance index models and one of the global similarity models corresponding to the first correct rate or the second correct rate; and adjusting the other one of the classification models, the other one of the reliance index models and the other one of the similarity models by using the actual processing event index values and the values of the parameters in their corresponding sets of process data to the sets of model-building data, when the sets of model-building data are balanced.

10. The method of claim 6, further comprising:

performing an oversampling operation on the sets of model-building data to generate a plurality of sets of sample data similar to data in a minority class in the sets of model-building data, thereby overcoming data imbalance of the sets of model-building data; and adding the sets of sample data to the sets of model-building data.

11. The method of claim 6, wherein the classification algorithms are a random forest algorithm and an extreme gradient boosting (XGboost) algorithm.

12. A computer program product stored on a non-transitory tangible computer readable recording medium, which, when executed, performs a method for determining whether to activate a virtual metrology, the method comprising:

obtaining a plurality of sets of historical process data, wherein the sets of historical process data are used or generated by a production tool when a plurality of historical workpieces are processed by the production tool, and the sets of historical process data are one-to-one corresponding to the sets of historical workpieces;

obtaining a plurality of historical processing event index values used for indicating if a processing event occurred when the production tool processed each of the historical workpieces, wherein the historical processing event index values are one-to-one corresponding to the sets of historical process data, and the historical processing event index values and the sets of historical process data respectively form a plurality of sets of model-building data;

performing a model-building operation, comprising:

building two classification models by using the sets of model-building data in accordance with two classification algorithms, wherein each of the classification models comprises a plurality of decision trees; and building two reliance index models by using probabilities of the decision trees of each of the classification models; and performing a conjecturing operation, comprising:

obtaining at least one set of process data, wherein the at least one set of process data is used or generated by the production tool when at least one workpiece is processed;

inputting the at least one set of process data into the classification models, thereby obtaining at least one set of event predicted values used for indicating if the processing event occurred when the production tool processed each of the at least one workpiece, each of the at least one set of event predicted values comprising a first event predicted value and a second event predicted value;

using the reliance index models to compute two reliance index values of each of the at least one set of event predicted values;

selecting one of the reliance index values as a composite reliance index value, the one of the reliance index values corresponding to one of the first event predicted value and the second event predicted value that has a smaller reliance level than the other one of the first event predicted value and the second event predicted value;

checking if both of the first event predicted value and the second event predicted value indicate that the processing event will occur, thereby obtaining a first checking result;

activating a virtual metrology to conjecture quality of the workpiece when the first checking result is true;

checking if the composite reliance index value indicates that the one of the first event predicted value and the second event predicted value is smaller than a reliance index threshold when the first checking result is false, thereby obtaining a second checking result; and activating the virtual metrology to conjecture quality of the workpiece when the second checking result is true;

wherein the at least one set of event predicted values is used to actually adjust the production tool.

13. The computer program product of claim 12, wherein each of the sets of historical process data comprises a plurality of parameters, and each of the at least one set of process data comprises the parameters, the method further comprising:

performing a data preprocessing operation to convert values of the parameters in each of the sets of historical process data to first values of a plurality of parameter indicators by using a plurality of algorithms, wherein the parameter indicators are one-to-one corresponding to the algorithms, the sets of model-building data comprising the historical processing event index values and the first values of the parameter indicators converted from each of the sets of historical process data; and performing the data preprocessing operation to convert values of the parameters in each of the at least one set of process data to second values of the parameter indicators by using the algorithms, wherein the conjecturing operation comprises inputting the second values of the parameter indicators into the classification model, thereby obtaining the at least one event predicted value.

14. The computer program product of claim 13, wherein the model-building operation comprises:

building two similarity models by using the sets of model-building data in accordance with a statistical distance algorithm;

the method further comprising:

respectively using the two similarity models to compute two global similarity indexes between the sets of model-building data and the second values of the parameter indicators in each of the at least one set of process data;

selecting one of the global similarity indexes as a composite global similarity index value, the one of the global similarity indexes representing less degrees of similarity between the sets of model-building data and the second values of the parameter indicators in each of the at least one set of process data;

checking if the composite global similarity index indicates that the degrees of similarity between the sets of model-building data and the second values of the parameter indicators in each of the at least one set of process data is smaller than a global similarity index threshold when the second checking result is false, thereby obtaining a third checking result; and activating the virtual metrology to conjecture quality of the workpiece when the third checking result is true.

15. The computer program product of claim 14, wherein the number of the at least one set of process data is greater than one, and the number of the at least one workpiece is greater than one, the method further comprising:

obtaining a plurality of actual processing event index values used for indicating if the processing event occurs when the production tool is processing each of the workpieces;

obtaining a first correct rate of the first event predicted values and a second correct rate of the second event predicted values according to the actual processing event index values;

checking if the sets of model-building data are imbalanced when the first correct rate or the first correct rate is smaller than a correct-rate threshold;

adding the actual processing event index values and the values of the parameters in their corresponding sets of process data to the sets of model-building data when the sets of model-building data are imbalanced, and then performing the model-building operation again to retrain one of the classification models, one of the reliance index models and one of the global similarity models corresponding to the first correct rate or the second correct rate; and adjusting the other one of the classification models, the other one of the reliance index models and the other one of the similarity models by using the actual processing event index values and the values of the parameters in their corresponding sets of process data to the sets of model-building data, when the sets of model-building data are balanced.

16. The computer program product of claim 12, the method further comprising:

performing an oversampling operation on the sets of model-building data to generate a plurality of sets of sample data similar to data in a minority class in the sets of model-building data, thereby overcoming data imbalance of the sets of model-building data; and adding the sets of sample data to the sets of model-building data.

17. The computer program product of claim 12, wherein the classification algorithms are a random forest algorithm and an extreme gradient boosting (XGboost) algorithm.

* * * * *